US012715947B2

(12) United States Patent
Buss et al.

(10) Patent No.: US 12,715,947 B2
(45) Date of Patent: Aug. 25, 2026

(54) AQUEOUS DISPERSION OF ACRYLATE-SILOXANE COPOLYMER PARTICLES

(71) Applicants: Dow Global Technologies LLC, Midland, MI (US); Dow Silicones Corporation, Midland, MI (US); Rohm and Haas Company, Collegeville, PA (US)

(72) Inventors: Hilda G. Buss, Norristown, PA (US); Matthew Carter, Bala Cynwyd, PA (US); Ralph C. Even, Blue Bell, PA (US); Jason S. Fisk, Midland, MI (US); Matthew Jeletic, Midland, MI (US); Tzu-Chi Kuo, Midland, MI (US); Tian Lan, Langhorne, PA (US); Nanguo Liu, Midland, MI (US); Bryan L. McCulloch, Olympia, WA (US); Jodi Mecca, Midland, MI (US); Arash R. Nowbahar, Midland, MI (US); Tanvi S. Ratani, Pittsburgh, PA (US); Muhunthan Sathiosatham, Chalfont, PA (US); Richard P. Woodworth, North Wales, PA (US); Fanwen Zeng, Audubon, PA (US)

(73) Assignees: Rohm and Haas Company, Collegeville, PA (US); Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 1046 days.

(21) Appl. No.: 17/796,119

(22) PCT Filed: Feb. 10, 2021

(86) PCT No.: PCT/US2021/017312

§ 371 (c)(1),
(2) Date: Jul. 28, 2022

(87) PCT Pub. No.: WO2021/163085

PCT Pub. Date: Aug. 19, 2021

(65) Prior Publication Data

US 2023/0096043 A1 Mar. 30, 2023

Related U.S. Application Data

(60) Provisional application No. 62/976,395, filed on Feb. 14, 2020.

(51) Int. Cl.

| | |
|---|---|
| ***C08F 2/26*** | (2006.01) |
| ***C08F 2/30*** | (2006.01) |
| ***C08F 230/08*** | (2006.01) |

(52) U.S. Cl.

CPC ............ *C08F 230/085* (2020.02); *C08F 2/26* (2013.01); *C08F 2/30* (2013.01)

(58) Field of Classification Search

CPC .......... C08F 230/085; C08F 2/30; C08F 2/26; C08F 2/24; C08F 220/14; C08F 220/06; C08F 220/1804; C08F 230/08; A61K 8/04

See application file for complete search history.

(56) References Cited

U.S. PATENT DOCUMENTS

| | | | |
|---|---|---|---|
| 5,731,379 | A | 3/1998 | Kennan et al. |
| 5,840,813 | A | 11/1998 | Gornowicz et al. |
| 10,723,838 | B2 | 7/2020 | Bohling et al. |
| 2009/0186982 | A1 | 7/2009 | Minge et al. |
| 2017/0260393 | A1 | 9/2017 | Phukan et al. |

FOREIGN PATENT DOCUMENTS

| | | |
|---|---|---|
| CN | 105601799 | 5/2016 |
| JP | 2011213941 | 10/2011 |
| WO | 199010028 | 9/1990 |
| WO | 2017156228 | 9/2017 |

OTHER PUBLICATIONS

Xiao, "Organosilicone modification of allyl methacrylate with speier's catalyst for waterborne self-matting styrene-acrylic emulsion" 2018, vol. 116, p. 1-6.

Zhang, "A novel approach for the preparation of organic-siloxane oligomers and the creation of hydophobic surface" 2007, vol. 254, p. 452-458.

83553-US-PCT.

*Primary Examiner* — Catherine S Branch

(57) ABSTRACT

The present invention is a composition comprising an aqueous dispersion of copolymer particles comprising structural units of a) an acrylate monomer; b) an acid monomer; and c) a siloxane-acrylate monomer of formula I:

I

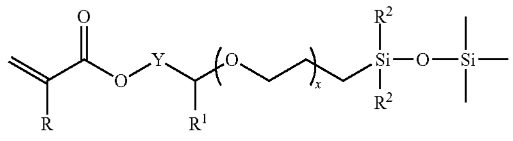

where R, $R^1$, $R^2$, Y and x are defined herein. The composition, which also comprises a nonionic and anionic surfactant as described herein, is useful in a variety of applications ranging from architectural coatings to personal care products.

8 Claims, No Drawings

AQUEOUS DISPERSION OF ACRYLATE-SILOXANE COPOLYMER PARTICLES

BACKGROUND OF THE INVENTION

The present invention relates to an aqueous dispersion of copolymer particles comprising structural units of an acrylate monomer and a siloxane-acrylate monomer. The composition of the present invention is useful for coatings and personal care applications.

Water-borne hybrid latex compositions that comprise copolymer particles functionalized with acrylate and siloxane groups provide improved performance in coating and cosmetic applications such as improved stain and solvent resistance, water and oil repellency, non-biofouling properties, and increased haptics as compared to all-acrylic compositions.

Xiao, J. et al., Frog. Org. Coat. 2018, 116, 1-6 and Zhang, B. et al., Appl. Surf. Sci. 2007, 254, 452-458 report the preparation of polymeric dispersions of siloxane-acrylic hybrid particles. However, the processes used to prepare these dispersions have been shown by the present inventors to result in latexes with high levels of gel and unreacted monomer. The formation of high concentrations of gel, which is a strong indicator of an inefficient process, can lead to reactor fouling and contribute to inferior properties of the final coating; moreover, the concentration of incorporated siloxane-containing monomer in each of these reported processes was significantly less than 10 weight percent, which limits the effectiveness of the dispersions. It is widely accepted that achieving relatively high levels of incorporated siloxane-containing monomer in the final dispersed copolymer particles (for example, >20% by weight) results in coatings and personal care formulation additives that exhibit improvements in the desirable properties associated siloxane-containing oligomers and polymers.

Accordingly, it would be advantageous to prepare aqueous dispersions of siloxane-acrylate copolymer particles functionalized with relatively high concentrations of structural units of a siloxane-containing monomer.

SUMMARY OF THE INVENTION

The present invention addresses a need in the art by providing a composition comprising an aqueous dispersion of copolymer particles having a z-average particle size in the range of from 50 nm to 500 nm and comprising, based on the weight of the copolymer particles, a) from 40 to 98.8 weight percent structural units of an acrylate monomer; b) from 0.1 to 5 weight percent structural units of an acid monomer; and c) from 1 to 59.8 weight percent structural units of a siloxane-acrylate monomer of formula I:

I

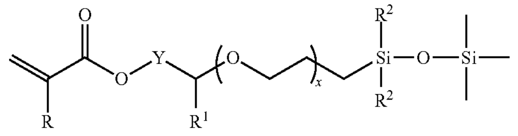

where R is H or $CH_3$;

$R^1$ is H or $CH_3$;

each $R^2$ is independently $CH_3$ or O—$Si(CH_3)_3$;

Y is —$CH_2$— or —$CH_2CH_2$—; and x is 0 or 1;

with the proviso that when x is 1, $R^1$ is H; when Y is —$CH_2$—, $R^1$ is H; and when Y is —$CH_2CH_2$—, $R^1$ is $CH_3$ and x is 0;

wherein the solids content of the copolymer particles in the aqueous dispersion is in the range of 30 to 55 weight percent and a) the aqueous phase of the aqueous dispersion comprises not greater than 1000 ppm of monomer of formula I; or b) the aqueous phase of the aqueous dispersion comprises not greater than 10000 ppm of coagulum; wherein the composition further comprises a) from 0.5 to 5 weight percent, based on the weight of the copolymer particles, of a nonionic surfactant of formula II:

II

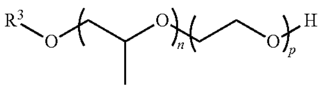

where n is from 0 to 10; p is from 2 to 30, with the proviso that p≥n; and $R^3$ is a linear or branched $C_3$-$C_{16}$-alkyl group; and b) from 0.5 to 5 weight percent, based on the weight of the copolymer particles of an anionic surfactant of formula III:

III

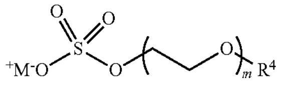

where $R^4$ is $C_6$-$C_{20}$-alkyl; m is from 0 to 10; and M is Li, Na, or K.

The present invention addresses a need in the art by providing a latex with high incorporation of siloxane-based monomer into a latex particle with low coagulum (gel) formation.

DETAILED DESCRIPTION OF THE INVENTION

The present invention is a composition comprising an aqueous dispersion of copolymer particles having a z-average particle size in the range of from 50 nm to 500 nm and comprising, based on the weight of the copolymer particles, a) from 40 to 98.8 weight percent structural units of an acrylate monomer; b) from 0.1 to 5 weight percent structural units of an acid monomer; and c) from 1 to 59.8 weight percent structural units of a siloxane-acrylate monomer of formula I:

I

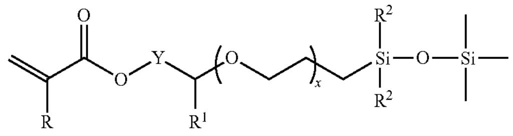

where R is H or $CH_3$;

$R^1$ is H or $CH_3$;

each $R^2$ is independently $CH_3$ or O—$Si(CH_3)_3$;

Y is $—CH_2—$ or $—CH_2CH_2—$; and x is 0 or 1;

with the proviso that when x is 1, $R^1$ is H; when Y is $—CH_2—$, $R^1$ is H; and when Y is $—CH_2CH_2—$, $R^1$ is $CH_3$ and x is 0;

wherein the solids content of the copolymer particles in the aqueous dispersion is in the range of 30 to 55 weight percent and a) the aqueous phase of the aqueous dispersion comprises not greater than 1000 ppm of monomer of formula I; or b) the aqueous phase of the aqueous dispersion comprises not greater than 10000 ppm of coagulum; wherein the composition further comprises a) from 0.5 to 5 weight percent, based on the weight of the copolymer particles, of a nonionic surfactant of formula II:

II

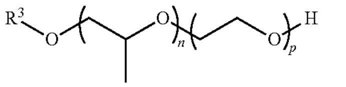

where n is from 0 to 10; p is from 2 to 30, with the proviso that p≥n; and $R^3$ is a linear or branched $C_3$-$C_{16}$-alkyl group; and b) from 0.5 to 5 weight percent, based on the weight of the copolymer particles of an anionic surfactant of formula III:

III

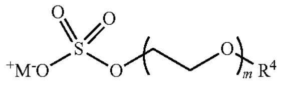

where $R^4$ is $C_6$-$C_{20}$-alkyl; m is from 0 to 10; and M is Li, Na, or K.

As used herein, the term "structural unit" of a recited monomer refers to the remnant of the monomer after polymerization. For example, a structural unit of methyl methacrylate (MMA) is as illustrated:

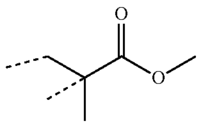

structural unit of methyl methacrylate where the dotted lines represent the points of attachment of the structural unit to the polymer backbone.

As used herein, the term "acrylate monomer" refers to one or more acrylate and/or methacrylate monomers. Examples of suitable acrylate monomers including MMA, n-butyl methacrylate (BMA), ethyl acrylate (EA), n-butyl acrylate (BA), and 2-ethylhexyl acrylate (2-EHA). Preferably, at least 80, and more preferably at least 90 weight percent of the acrylate monomer is a combination of MMA and BA.

The copolymer preferably also comprises from 0.1 to 5 weight percent, based on the weight of the copolymer, structural units of an acid monomer such as a carboxylic acid monomer, a phosphorus acid monomer, or a sulfur acid monomer. Examples of carboxylic acid monomers include acrylic acid (AA), methacrylic acid (MAA), and itaconic acid (IA), and salts thereof.

Suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl acrylates or methacrylates, including phosphoethyl methacrylate (PEM) and phosphopropyl methacrylates.

Examples of suitable sulfur acid monomers include sulfoethyl methacrylate, sulfopropyl methacrylate, styrene sulfonic acid, vinyl sulfonic acid, and 2-acrylamido-2-methyl propanesulfonic acid (AMPS), and salts thereof.

Preferably, the copolymer particles comprise structural units of MMA, BA, MAA, and the siloxane-acrylate monomer of formula I.

In one aspect, the weight-to-weight ratio of structural units of BA to structural units of MMA is in the range of from 45:55 to 55:45; in another aspect, the weight-to-weight ratio of structural units of total acrylate monomer, preferably BA and MMA, to structural units of the acid monomer, preferably MAA, is in the range of from 99.95:0.05, more preferably from 99.5:0.5 to 97:3, more preferably to 98:2.

The preferred range of structural units of the siloxane-acrylate monomer of formula I is application dependent. For home and personal care applications such as cosmetics, hair care, and skin care, the weight percent structural units of the formula I monomer in the copolymer particles, based on the weight of the copolymer particles, is preferably in the range of from 20, more preferably from 30, and most preferably from 45 weight percent, to 55 weight percent. For coatings applications, the preferred weight percent is in the range of from 2, more preferably from 3 weight percent, to 20 more preferably, to 15, and most preferably to 10 weight percent, based on the weight of the copolymer particles.

Examples of monomers of formula I include:

M3T'-ALMA

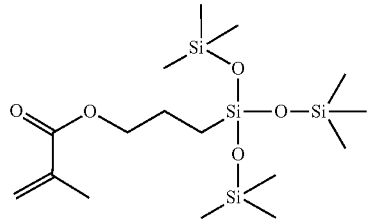

MD'M-1EO-ALMA

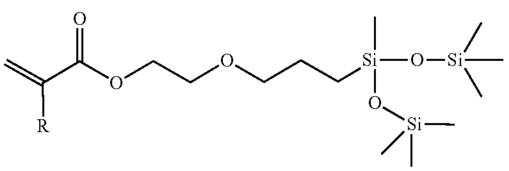

MM'-ALMA

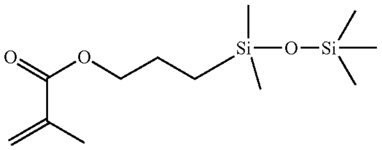

MM'-1EO-ALMA

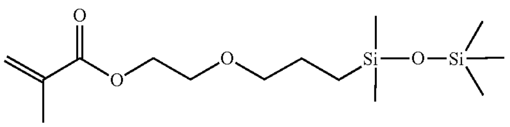

-continued

MD′M-IPMA

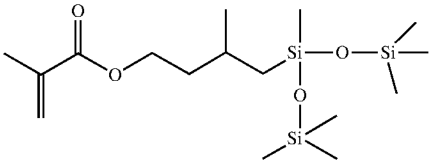

MD′M-ALMA

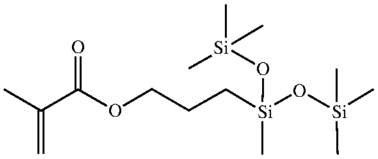

The nonionic surfactant of formula II preferably comprises branched alkyl groups; n is preferably in the range of from 0 to 5; and p is preferably in the range of from 3 to 16. Examples of suitable commercial nonionic surfactants include TERGITOL™ 15-S-9 nonionic surfactant (15-S-9; A Trademark of The Dow Chemical Company or Its Affiliates), TERGITOL TMN-3 nonionic surfactant (TMN-3), TERGITOL TMN-6 nonionic surfactant (TMN-6), TERGITOL TMN-10 nonionic surfactant (TMN-10), ECOSURF™ EH-6 nonionic surfactant (EH-6; A Trademark of The Dow Chemical Company or Its Affiliates). The structures of these surfactants are as illustrated:

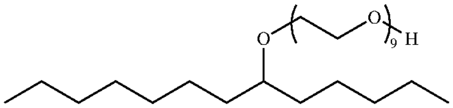

15-S-9

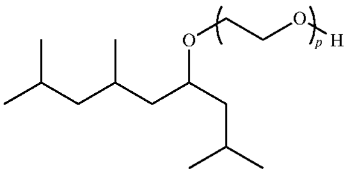

TMN-3: p=3
TMN-6: p=8
TMN-10: p=11

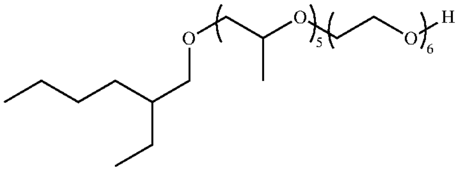

EH-6

The concentration of the nonionic surfactant of formula II is preferably in the range of from 1 to 3 weight percent, based on the weight of the monomers.

The anionic surfactant of formula III is preferably a linear $C_{10}$-$C_{14}$-alkyl sulfate, where m is 0. A preferred anionic surfactant is sodium lauryl sulfate (SLS). The concentration of the anionic surfactant of formula III is preferably in the range of from 1 to 3 weight percent, based on the weight of the monomers; preferably the weight:to:weight ratio of anionic surfactant to nonionic surfactant is in the range of 1:2 to 2:1.

The composition preferably comprises less than 1000 ppm of coagulum (gel) and preferably less than 100 ppm residual monomer.

A preferred method for preparing the aqueous dispersion of acrylate-siloxane copolymer particles comprises the steps of:

1) adding a first portion of an aqueous monomer emulsion into a vessel containing water, an anionic surfactant, and optionally a nonionic surfactant, wherein the contents of the vessel are stirred and controlled at a temperature in the range of from 60° C., more preferably from 80° C., to 95° C.;
2) adding a first portion of an initiator to the vessel to form, over time, an aqueous dispersion of seed copolymer particles; then
3) gradually adding a second portion of the monomer emulsion and a second portion of the initiator to the vessel; then
4) maintaining the temperature of the contents of the vessel in the range of from 60° C., more preferably from 80° C. to 95° C. for a sufficient time to achieve substantially complete conversion of the monomers to copolymer particles comprising structural units of the monomers.

Preferably, after step 4), a redox initiator package is added to the vessel; it is also preferred after step 4) to neutralize the aqueous dispersion to a pH in the range of from 6.5 to 7.5. It is more preferred after step 4) to add the redox initiator package followed by addition of a neutralizing agent.

It has surprisingly been discovered that efficient incorporation of high levels of siloxane-acrylate monomer of formula I into a siloxane-acrylate copolymer can be achieved by the process of the present invention without substantial formation of coagulum (gel), as determined gravimetrically, and large diameter particles (that is, particles having a particle size diameter >1 μm and <40 μm as determined by single particle optical sensing described herein).

Particle Sizing Method

Particle sizes were measured using a Malvern Zetasizer Nano ZS90, which measures Z-average particle size ($D_z$) using dynamic light scattering (DLS) at a scattering angle of 90° using Zetasizer software version 7.11. A drop of the sample dispersion was diluted using an aqueous solution of MilliQ water (18.2 MΩ at 25° C.) to achieve a particle count in the range of 200-400 thousand counts/s (Kcps). Particle size measurements were carried using instrument's particle sizing method and $D_z$ was computed by the software. $D_z$ is also known as the intensity-based harmonic mean average particle size and expressed as;

$$D_z = \frac{\sum S_i}{\sum (S_i/D_i)}$$

Here, $S_i$ is scattered intensity from particle i with diameter $D_i$. Detailed $D_z$ calculations are described in ISO 22412:2017 (Particle size analysis-Dynamic light scattering (DLS)).

Determination of Suspension Polymer Level by AccuSizer

The amount of suspension polymer in a copolymer particle dispersion was measured using an AccuSizer 7000 APS Single-Particle Optical Sensor instrument (Particle Sizing Systems, PSS, an Entegris Company, Port Richey, FL). A copolymer particle dispersion was diluted 1000-fold by mass in MilliQ water and then injected into the instrument's sample chamber. The experimental method applied a two-stage dilution of the injected sample, with a first dilution of 21.6 in the pre-dilution chamber, and a second dilution of 78.4 in the second stage dilution zone of the instrument. After data collection was completed, the sample chamber was flushed with MilliQ water until a baseline threshold of less than 200 counts per milliliter was observed. The sampling method was set to measure approximately 100 000 total counts, and particles that measured >1 μm in diameter were defined as suspension polymer. Samples were run in duplicate and data is presented as an average. Data was collected and processed using PSS Software (Version 2.3.1.6).

Example 1—Preparation of an Aqueous Dispersion of Hybrid Copolymer Particles Using a Mixture of SLS and 15-S-9 Nonionic Surfactant Deionized water (150.0 g), Polystep B-5-N sodium lauryl sulfate (SLS, 3.0 g, 28.0% in water) and 15-S-9 (3.0 g) were added to a 500-mL, 4-neck round bottom flask outfitted with a condenser, overhead stirrer, and thermocouple. The contents of the reactor were stirred at 250 rpm and heated to 88° C. under $N_2$. In a separate vessel, a monomer emulsion (ME) containing deionized water (180.0 g), SLS (14.1 g, 28.0% in water), 15-S-9 (3.0 g), BA (73.5 g), MMA (73.5 g), MAA (3.0 g), MD'M-ALMA (150.0 g), n-dodecyl mercaptan (n-DDM, 0.15 g), ammonium hydroxide solution (2.8 g, 28% active in water), and sodium acetate (0.9 g) was prepared using an overhead mixer followed by treatment with a handheld homogenizer (Tissue Tearor, Model 985370, Biospec Products Inc.) for 1 min to produce an ME with average droplet size of ~2-15 μm, as determined by optical microscopy. A portion of the ME (20.0 g) was added to the reactor with rinsing (5.0 g water), followed by the addition of ammonium persulfate (APS, 0.09 g) with rinsing (2.0 g water). The remainder of the ME and a solution of APS (0.32 g in 24.0 g water) were fed simultaneously into the reactor over 120 min, at a temperature of 87-88° C. Upon completion of the feeds, the reactor was then held for an additional 30 min at 87-88° C. The reactor was then cooled to 60° C. whereupon separate solutions of (i) Luperox TAH 85 t-amyl hydroperoxide (t-AHP, 0.29 g, 85 wt % active in water), SLS (0.06 g, 28% active in water), and deionized water (3.0 g) and (ii) isoascorbic acid (IAA, 0.15 g), VERSENE™ EDTA (EDTA, A Trademark of Dow, Inc. or its Affiliates; 0.3 g, 1% active in water), and iron (II) sulfate solution (2.1 g, 0.15% active in water) were added to the reactor. The reactor was then cooled to room temperature, whereupon ammonium hydroxide solution (28% active in water) was added dropwise to adjust the pH to ~7.0. The aqueous dispersion was filtered successively through stainless steel mesh screens of pore sizes 840 μm, 150 μm, and 40 μm. The final aqueous particle dispersion had a solids of 43.0%, a z-average particle size of 103 nm as determined by DLS, a final polymer coagulum (gel) level of 0.11 wt % (based on monomer; sum of gel collected on each mesh size), and 0.43 wt % suspension polymer (based on monomer) as determined by Accusizer characterization. The level of residual MD'M-ALMA in the sample was <30 ppm as determined by UHPLC.

Example 2—Preparation of an Aqueous Dispersion of Hybrid Copolymer Particles Using a Mixture of SLS and TMN-6 Nonionic Surfactant Example 1 was repeated, except that 15-S-9 nonionic surfactant in both the 500-mL 4-neck round bottom flask and in the ME was replaced by an equal mass of TMN-6 nonionic surfactant. The final aqueous particle dispersion had a solids of 42.8%, a z-average particle size of 100 nm as determined by DLS, a final polymer gel level of 0.12 wt % (based on monomer; sum of gel collected on each mesh size), and 1.75 wt % suspension polymer (based on monomer) as determined by Accusizer characterization. The level of residual MD'M-ALMA in the sample was <30 ppm as determined by UHPLC.

Example 3—Preparation of an Aqueous Dispersion of Hybrid Copolymer Particles Using a Mixture of SLS and a TMN-10 Nonionic Surfactant Example 1 was repeated, except that 15-S-9 nonionic surfactant in both the 500-mL 4-neck round bottom flask and in the ME was replaced by an equal mass of TMN-10 nonionic surfactant. The final aqueous particle dispersion had a solids of 42.7%, a z-average particle size of 115 nm as determined by DLS, a final polymer gel level of 0.18 wt % (based on monomer; sum of gel collected on each mesh size), and 1.01 wt % suspension polymer (based on monomer) as determined by Accusizer characterization. The level of residual MD'M-ALMA in the sample was <30 ppm as determined by UHPLC.

Example 4—Preparation of an Aqueous Dispersion of Hybrid Copolymer Particles Using a Mixture of SLS and EH-6 Nonionic Surfactant Example 1 was repeated, except that 15-S-9 nonionic surfactant in both the 500-mL 4-neck round bottom flask and in the ME was replaced by an equal mass of EH-6 nonionic surfactant. The final aqueous particle dispersion had a solids of 42.5%, a z-average particle size of 103 nm as determined by DLS, a final polymer gel level of 0.18 wt % (based on monomer; sum of gel collected on each mesh size), and 1.75 wt % suspension polymer (based on monomer) as determined by Accusizer characterization. The level of residual MD'M-ALMA in the sample was <30 ppm as determined by UHPLC.

Comparative Example 1—Preparation of an Aqueous Dispersion of Hybrid Copolymer Particles Using SLS Example 1 was repeated, except that SLS only was added to both the 500-mL 4-neck round bottom flask (13.36 g, 1.29 wt % based on monomer) and the ME (24.45 g, 2.36 wt % based on monomer). The final aqueous copolymer particle dispersion had a solids of 37.8%, a z-average particle size of 78 nm as determined by DLS, a final polymer gel level of 2.50 wt % (based on monomer; sum of gel collected on each mesh size), and 1.60 wt % suspension polymer (based on monomer) as determined by Accusizer characterization. The level of residual MD'M-ALMA in the sample was 2500 ppm as determined by UHPLC.

Comparative Example 2—Preparation of an Aqueous Dispersion of Hybrid Copolymer Particles Using 15-S-9 Non-Anionic Surfactant Example 1 was repeated, except that 15-S-9 only was added to both the 500-mL 4-neck round bottom flask (6.00 g, 2.00 wt % based on monomer) and the ME (17.1 g, 5.70 wt % based on monomer). The copolymer particle dispersion irreversibly gelled in-process at approximately 100 min into the ME feed. (46.2% solids theoretical; 19.8% actual.)

Comparative Example 3—Preparation of an Aqueous Dispersion of Hybrid Copolymer Particles by Xiao Process The process to prepare an aqueous dispersion of hybrid particles as described in Xiao, J. et al., *Prog. Org. Coatings* 2018, 116, 1-6 was reproduced. The synthesis was carried out using a 500-mL, 4-neck round bottom flask outfitted with a condenser, overhead stirrer, and thermocouple. Deionized water (19.0 g) and SLS (1.43 g, 28.0% in water), TRITON™ X-100 Polyethylene glycol t-octylphenyl ether (A Trademark of Dow, Inc. or its affiliates, 0.80 g), and sodium bicarbonate ($NaHCO_3$; 0.40 g) were added to the flask. The contents of the reactor were stirred at 100 rpm and heated to 60° C. under $N_2$. In a separate vessel, an ME containing deionized water (48.5 g), SLS (2.14 g, 28.0% in water), Triton X-100 (1.20 g), BA (BA; 44.8 g), MMA (42.3 g), styrene (10.1 g), and AA (1.9 g) was prepared using an overhead mixer. A portion of the ME (15.1 g) was added to the reactor, followed by the addition of APS (0.13 g) in deionized water (10.0 g), and the reactor temperature was increased to 80° C. over 10 min. The remainder of the ME and a solution of APS (0.27 g in 20.0 g water) were fed simultaneously into the reactor over 4.5 h and 5 h, respectively, at a temperature of 80-81° C. (that is, the APS feed continued for 30 min after the completion of the ME feed). At the 3-h mark of feeds, MD'M ALMA was added to the reactor (10.0 g).

Upon completion of the APS feed, the reactor was then held for an additional 30 min at 80° C. The reactor was then cooled to room temperature and ammonium hydroxide solution (28% active in water) was added dropwise to raise the pH to ~8.5. The aqueous dispersion was filtered successively through stainless steel mesh screens of pore sizes of 150 μm and 40 μm. The final aqueous particle dispersion had a solids of 44.3% (theoretical=53.0%), a z-average particle size of 135 nm as determined by DLS, a final polymer gel level of 0.80 wt % (based on monomer; sum of gel collected on each mesh size), and 2.69 wt % suspension polymer (based on monomer) as determined by Accusizer characterization. The level of residual MD'M-ALMA in the serum phase was 13,700 ppm as determined by UHPLC.

Comparative Example 4—Preparation of an Aqueous Dispersion of Hybrid Copolymer Particles by Zhang Process The process to prepare an aqueous dispersion of hybrid particles as described in Zhang, B. et al., *Appl. Surf. Sci.* 2007, 254, 452-458 was reproduced. Deionized water (60.0 g), sodium dodecylbenzene sulfonic acid (0.30 g), and Span 20 sorbitani monolaurate (0.50 g) were added to a 100-mL glass reactor equipped with a condenser, overhead stirrer, and thermocouple. The reactor contents were stirred at 100 rpm, heated to 80° C., and sparged with $N_2$ for 30 min. In a separate vessel, a monomer mixture composed of MMA (12.0 g), BA (12.0 g), and MD'M-ALMA (1.2 g) was prepared. The monomer mixture and a solution of APS (0.05 g in 10.0 g water) were fed simultaneously into the reactor over 120 min, at a temperature of 80-81° C. Upon completion of the feeds, the reactor was then held for an additional 6 h at 80-81° C. The reactor was then cooled to room temperature, whereupon ammonium hydroxide solution (28% active in water) was added dropwise to raise the pH to ~7.0. The final aqueous particle dispersion had a solids of 22.8% (theoretical=27.1%), a z-average particle size of 64 nm as determined by DLS, a final polymer gel level of 1.97 wt % (based on monomer; sum of gel collected on each mesh size), and 0.66 wt % suspension polymer (based on monomer) as determined by Accusizer characterization. The level of residual MD'M-ALMA in the serum phase was 13,700 ppm as determined by UHPLC.

Table 1 shows surfactant type and corresponding mass, based on monomer, added to the monomer emulsion (ME) and/or the kettle; the amount of unreacted residual siloxane-acrylate monomer (Final MD'M-ALMA); the concentration of suspension copolymer particles formed having a diameter >1 μm and <40 μm (ppm susp polymer), based on monomer; the concentration of gel formed (ppm gel), based on monomer; and the sum of the concentrations of both gel and suspension copolymer particles (% susp+gel) expressed as a weight percent based on monomer. ND indicates that monomer amounts were not detected above 30 ppm. The percentages of starting material in the monomer emulsion (ME) and the kettle are based on the weight of the monomers. The table shows the criticality of using both nonionic and anionic surfactants in the process to reduce gel formation and improve the conversion of the siloxane acrylate monomer MD'M-ALMA.

TABLE 1

Residual Monomer, Suspension Polymer, and Gel Formation in Emulsion Polymerization Reaction

| | % anionic in ME | % nonionic in ME | % anionic in kettle | % nonionic in kettle | Final MD'M-ALMA (ppm) | ppm susp polymer | ppm gel | % susp + gel |
|---|---|---|---|---|---|---|---|---|
| Ex 1 | 1.36 | 1.00 | 0.29 | 1.00 | ND | 4300 | 490 | 0.48 |
| Ex 2 | 1.36 | 1.00 | 0.29 | 1.00 | ND | 17500 | 520 | 1.80 |
| Ex 3 | 1.36 | 1.00 | 0.29 | 1.00 | ND | 15700 | 530 | 1.62 |
| Ex 4 | 1.36 | 1.00 | 0.29 | 1.00 | ND | 17500 | 810 | 1.83 |
| C1 | 2.36 | — | 1.29 | — | 2500 | 16000 | 9040 | 2.50 |
| C2 | — | 5.70 | — | 2.00 | — | GELLED | | — |
| C3 | 0.55 | 1.10 | 0.37 | 0.73 | 13700 | 26900 | 8000 | 3.49 |
| C4 | — | — | 1.19 | 1.98 | 400 | 6600 | 19700 | 2.63 |

The data show that high concentrations of a siloxane-acrylate monomer can be incorporated into copolymer particles with relatively low gel formation and low residual monomer.

The invention claimed is:

1. A composition comprising an aqueous dispersion of copolymer particles having a z-average particle size in the range of from 50 nm to 500 nm and comprising, based on the weight of the copolymer particles, a) from 40 to 98.8 weight percent structural units of an acrylate monomer; b) from 0.1 to 5 weight percent structural units of an acid monomer; and c) from 1 to 59.8 weight percent structural units of a siloxane-acrylate monomer of formula I:

I

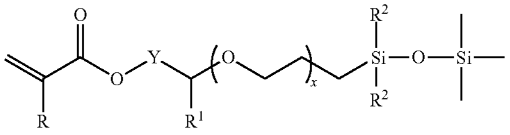

where R is H or $CH_3$;

$R^1$ is H or $CH_3$;

each $R^2$ is independently $CH_3$ or O—Si$(CH_3)_3$;

Y is —$CH_2$— or —$CH_2CH_2$—; and x is 0 or 1;

with the proviso that when x is 1, $R^1$ is H; when Y is —$CH_2$—, $R^1$ is H; and when Y is —$CH_2CH_2$—, $R^1$ is $CH_3$ and x is 0;

wherein the solids content of the copolymer particles in the aqueous dispersion is in the range of 30 to 55 weight percent and a) the aqueous phase of the aqueous dispersion comprises not greater than 1000 ppm of monomer of formula I; or b) the aqueous phase of the aqueous dispersion comprises not greater than 10000 ppm of coagulum; wherein the composition further comprises a) from 0.5 to 5 weight percent, based on the weight of the copolymer particles, of a nonionic surfactant of formula II:

II

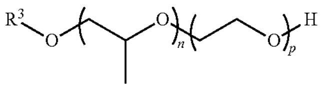

where n is from 0 to 10; p is from 2 to 30, with the proviso that p≥n; and $R^3$ is a linear or branched $C_3$-$C_{16}$-alkyl group; and b) from 0.5 to 5 weight percent, based on the weight of the copolymer particles of an anionic surfactant of formula III:

III

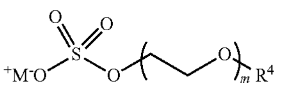

where $R^4$ is $C_6$-$C_{20}$-alkyl; m is from 0 to 10; and M is Li, Na, or K.

2. The composition of claim 1 wherein the siloxane-acrylate monomer of formula I is:

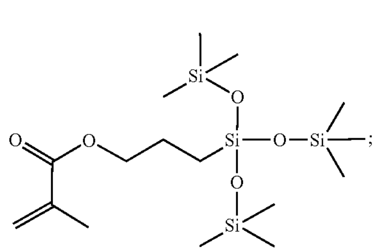

-continued

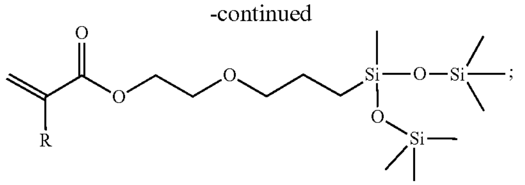

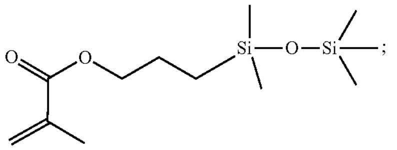

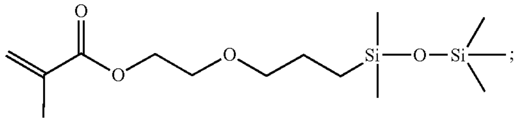

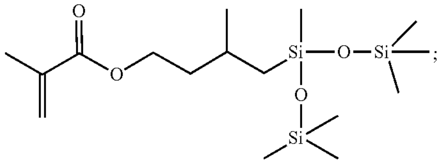

or

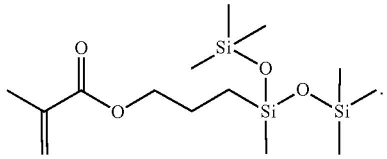

3. The composition of claim 2 wherein n is in the range of 0 to 5, and p is in the range of 3 to 16; the anionic surfactant of formula III is a linear $C_{10}$-$C_{14}$-alkyl sulfate, where m is 0; and wherein the weight percent of structural units of the siloxane-acrylate monomer is in the range of from 20 to 55 weight percent, based on the weight of the copolymer particles.

4. The composition of claim 2 wherein n is in the range of 0 to 5, and p is in the range of 3 to 16; the anionic surfactant of formula III is a linear $C_{10}$-$C_{14}$-alkyl sulfate, where m is 0; and wherein the weight percent of structural units of the siloxane-acrylate monomer is in the range of from 3 to 20 weight percent, based on the weight of the copolymer particles.

5. The composition of claim 3 wherein the acrylate monomer is butyl acrylate and methyl methacrylate, and the acid monomer is methacrylic acid.

6. The composition of claim 5 wherein the weight-to-weight ratio of structural units of butyl acrylate to structural units of methyl methacrylate is in the range of from 45:55 to 55:45; and wherein the weight-to-weight ratio of structural units of butyl acrylate and methyl methacrylate to structural units of methacrylic acid is in the range of from 99.5:0.5 to 97:3.

7. The composition of claim 6 wherein the nonionic surfactant of formula II is:

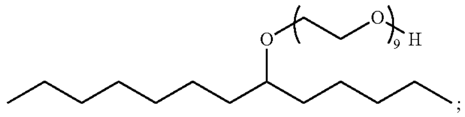

-continued

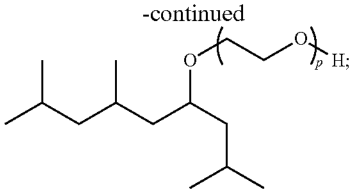

or

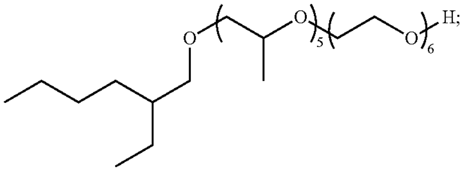

where p is 3, 8, or 11; and wherein the composition comprises less than 1000 ppm of coagulum and less than 100 ppm residual monomer.

8. The composition of claim 7 wherein the concentration of the nonionic surfactant and the anionic surfactant are each in the range of from 1 to 3 weight percent, based on the weight of the monomers; wherein the weight:to:weight ratio of the nonionic surfactant to the anionic surfactant is in the range of 1:2 to 2:1; wherein the nonionic surfactant is represented by:

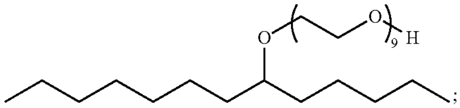

the anionic surfactant is sodium lauryl sulfate; and the siloxane-acrylate monomer of formula I is

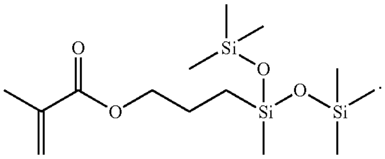 [SMILES: C=C(C)C(=O)OCCC[Si](C)(O[Si](C)(C)C)O[Si](C)(C)C]

* * * * *